United States Patent
Keesara et al.

(10) Patent No.: US 9,525,624 B2
(45) Date of Patent: Dec. 20, 2016

(54) VIRTUAL ROUTER REDUNDANCY PROTOCOL FOR SCALABLE DISTRIBUTED DEFAULT ROUTING GATEWAY

(71) Applicant: Avaya Inc., Basking Ridge, NJ (US)

(72) Inventors: Srikanth Keesara, Tewksbury, MA (US); Roger Lapuh, Uesslingen (CH)

(73) Assignee: Avaya Inc., Basking Ridge, NJ (US)

( * ) Notice: Subject to any disclaimer, the term of this patent is extended or adjusted under 35 U.S.C. 154(b) by 421 days.

(21) Appl. No.: 13/898,836

(22) Filed: May 21, 2013

(65) Prior Publication Data

US 2014/0347976 A1 Nov. 27, 2014

(51) Int. Cl.
*H04L 12/713* (2013.01)
*H04L 12/703* (2013.01)

(52) U.S. Cl.
CPC ............ *H04L 45/586* (2013.01); *H04L 45/28* (2013.01)

(58) Field of Classification Search
None
See application file for complete search history.

(56) References Cited

U.S. PATENT DOCUMENTS

| | | | |
|---|---|---|---|
| 9,128,688 B2* | 9/2015 | Liu ........................... G06F 1/26 | |
| 2003/0037165 A1* | 2/2003 | Shinomiya .............. H04L 29/06 | 709/238 |
| 2007/0081535 A1* | 4/2007 | Li .......................... H04L 12/433 | 370/392 |
| 2007/0230472 A1* | 10/2007 | Jesuraj .......................... 370/392 | |
| 2008/0151882 A1* | 6/2008 | Sanjay ................. H04L 45/586 | 370/389 |
| 2009/0016215 A1* | 1/2009 | Nadas ..................... H04L 45/02 | 370/230 |
| 2010/0098082 A1* | 4/2010 | Sampath ................. H04L 45/00 | 370/392 |
| 2010/0182926 A1* | 7/2010 | Kubota ......................... 370/252 | |
| 2012/0307727 A1* | 12/2012 | Yamada ................ H04L 45/586 | 370/328 |
| 2013/0201820 A1* | 8/2013 | Xiaoyong ............... H04L 41/06 | 370/220 |
| 2014/0321265 A1* | 10/2014 | Pitchai ................ G06F 11/2097 | 370/219 |
| 2015/0055650 A1* | 2/2015 | Bhat ..................... H04L 12/185 | 370/390 |

OTHER PUBLICATIONS

VRRP Technology White Paper; Aug. 31, 2012, Huawei Technologies Co., LTD.; Issue 01.*
Nadas S et al., "Virtual Router Redundancy Protocol (VRRP) Version 3 for IPv4 and IPv6: RFC 5798", Internet Engineering Task Force (IEFT, Switzerland, Mar. 10, 2010 (Mar. 10, 2010), 40 pages.
GB Search Report dated Jun. 4, 2014, 4 pages.

* cited by examiner

*Primary Examiner* — Brian D Nguyen
*Assistant Examiner* — Deepa Belur

(57) ABSTRACT

A VRRP router group can operate in either a standard VRRP mode or a distributed gateway mode in which all VRRP routers generate VRRP control packets but transmit those packets only to local access network-side hosts. The rate of VRRP control packet generation may be decreased in the distributed gateway mode relative to the standard mode. Moreover, VRRP router CPUs may cease processing of VRRP control packets in the distributed gateway mode.

8 Claims, 3 Drawing Sheets

VIRTUAL ROUTER REDUNDANCY PROTOCOL FOR SCALABLE DISTRIBUTED DEFAULT ROUTING GATEWAY

CROSS-REFERENCE TO RELATED APPLICATIONS

NA

BACKGROUND OF THE INVENTION

This invention relates generally to computer networks, and more particularly to virtual router groups. A basic enterprise network architecture includes a router which functions as a gateway for hosts in a LAN or other access network which is terminated at the distribution layer. One drawback of this basic architecture is that the router presents a single point of potential failure. In particular, the hosts in the access network lose connectivity with devices outside the access network upon failure of the gateway router.

One solution to the single point of potential failure problem of the basic architecture is to implement multiple gateway routers. Each host can utilize various discovery protocols to determine which router to utilize as the first hop toward a particular destination. Consequently, in a network with two gateway routers having different IP addresses the hosts will respond to a failure of one gateway router by resolving the IP address of the other gateway router so that traffic can be routed beyond the access network after the failure. One drawback of this solution is that it imposes routing overhead on the hosts. Consequently, recovery from a gateway router failure may be undesirably slow. Moreover, an access network may include a large number of hosts so a considerable amount of host resources may be tied up by discovery protocols. Further, some hosts may not be able to support the discovery protocols or identify the alternate path.

Another solution to the single point of potential failure problem is implementing a virtual router using the Virtual Router Redundancy Protocol (VRRP). VRRP enables a group of gateway routers to function as a single virtual router with a set of one or more static virtual IP addresses. An election procedure is used to designate one of the routers of the VRRP group as the master router. In one implementation the master router is responsible for forwarding data packets sent to any of the IP addresses associated with the VRRP group. The master router also sends VRRP control packets (hello messages) to all of the hosts. Backup routers in the VRRP group process those VRRP control packets to determine if the master router has become unavailable for forwarding data packets. In particular, if a VRRP control packet is not received from the master router within a predetermined period of time since the previously received VRRP control packet then the master router is considered to be unavailable and an election of a new master router is prompted. The election is based on priority indicators associated with each router in the VRRP group, and a previously unavailable master router can regain master router status upon becoming available again. Network administrators tend to favor frequent VRRP control packet generation and correspondingly short counters so that an unavailable master router can be quickly detected to expedite fail-over. Because the hosts can utilize the same set of virtual IP addresses both before and after the failure of a gateway router, the single point of failure can be avoided via redundancy without forcing hosts to discover other gateway routers. Further, VRRP does not impose significant overhead on the hosts and can distribute traffic loads across multiple routers.

SUMMARY OF THE INVENTION

Some aspects of the present invention are predicated in part on recognition that VRRP can significantly increase control plane overhead in a distributed network environment. The basic enterprise network architecture for which VRRP was designed is becoming less common as distributed access networks become more common. For example, an enterprise with multiple sites may group hosts at different sites but within the same access network. Further, host mobility can result in a non-static distributed architecture. In these scenarios the VRRP control traffic that all of the routers process in the control plane is increased. For example, some of the VRRP control packets are sent by the master router to backup routers outside the access network of the master router, e.g., via the network-network interface (NNI) of the master router rather than solely on a LAN with which the master router is associated. This problem is exacerbated as the number of VRRP routers and access networks is scaled up. However, even within a single access network it is possible for gateway routers to become overloaded by accidental or malicious looping of VRRP control packets.

In accordance with one aspect of the invention an apparatus comprises: a plurality of host devices associated with a first access network; and a plurality of routers associated with the first access network, the routers implementing a first mode of operation in which each of the routers of the plurality of router generates virtual router control packets.

In accordance with another aspect of the invention a method comprises: in a network including a plurality of host devices associated with a first access network and a plurality of routers associated with the first access network, the routers implementing a first mode of operation including generating, by each router of the plurality of routers, virtual router control packets.

In accordance with another aspect of the invention a computer program, stored on a non-transitory computer-readable medium, comprises: in a network including a plurality of host devices associated with a first access network and a plurality of routers associated with the first access network, the routers implementing a first mode of operation including logic which generates, by each router of the plurality of routers, virtual router control packets.

In accordance with various other aspects the routers can selectively implement either the first mode of operation or a second mode of operation in which one of the plurality of routers is selected as a master router and only the master router generates control packets. In the first mode of operation the routers transmit the control packets only to the host devices associated with the first access network. Further, the frequency of control packet generation is lower in the first mode of operation than in the second mode of operation, and the control packets are not processed by CPUs of the routers in the first mode of operation.

Advantages associated with aspects include avoiding the control plane overhead associated with sending VRRP control packets via an interconnecting network to other access networks of the same subnet. Moreover, the election of backup routers to be master router is obviated because all of the VRRP gateway routers are effectively master routers. It follows that the need for quick failover of a single master router is obviated, so it is possible to decrease the rate of VRRP control packet generation relative to the standard VRRP (second) mode. Further, halting the forwarding of VRRP control packets to gateway router CPUs has the advantage of protecting the gateway routers from undesirable VRRP control packet loops in the associated access network. It will be appreciated by those skilled in the art that as a result the VRRP control packet processing load of the gateway routers can theoretically be eliminated while in a distributed gateway VRRP (first) mode. Moreover, some of these advantages can be enjoyed in non-distributed networks.

Other features and advantages will be apparent to those of ordinary skill in the art in view of the detailed description and drawings.

DETAILED DESCRIPTION

Figure 1:
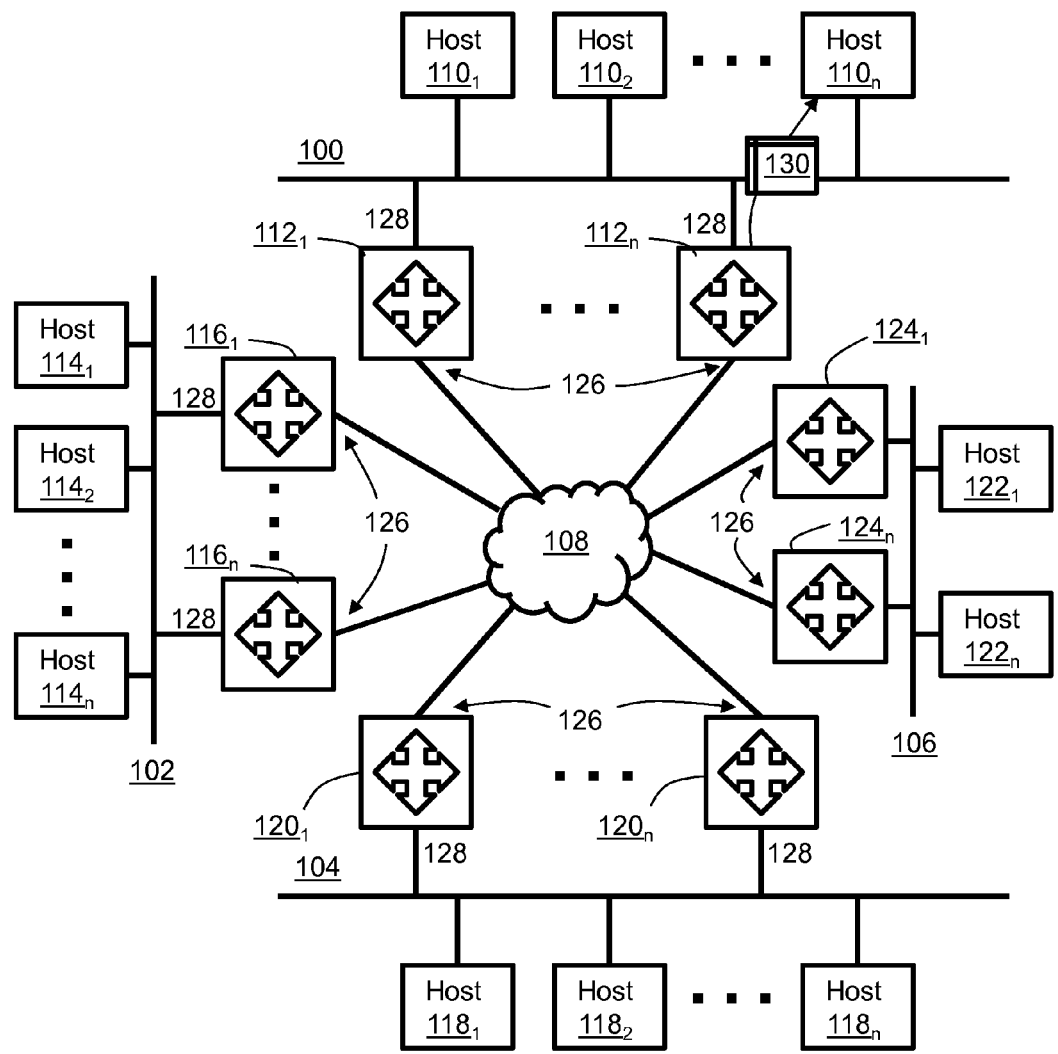
FIG. 1 illustrates a VRRP router group associated with a distributed network.

FIG. 1 illustrates a VRRP router group associated with a distributed subnet. In particular, four separate access networks 100, 102, 104, 106 are interconnected by a another network 108, e.g., using Shortest Path Bridging Mac (SPBM). Each access network includes a plurality of host devices and a plurality of VRRP gateway routers. In particular, access network 100 includes hosts $110_1$-$110_n$ and VRRP gateway routers $112_1$-$112_n$, access network 102 includes hosts $114_1$-$114_n$ and VRRP gateway routers $116_1$-$116_n$, access network 104 includes hosts $118_1$-$118_n$ and VRRP gateway routers $120_1$-$120_n$, and access network 106 includes hosts $122_1$-$122_n$ and VRRP gateway routers $124_1$-$124_n$. Each access network may include other network devices, e.g., L2 and L3 routing and switching devices. Each gateway router includes a network-network interface (NNI) 126 for communicating with other devices via network 108. Further, each gateway router includes an access interface 128 for communicating with devices in the access network with which that gateway router is associated. Because all of the access networks are associated with a single subnet, e.g., a particular VLAN, the subnet is considered to be distributed.

Figure 2:
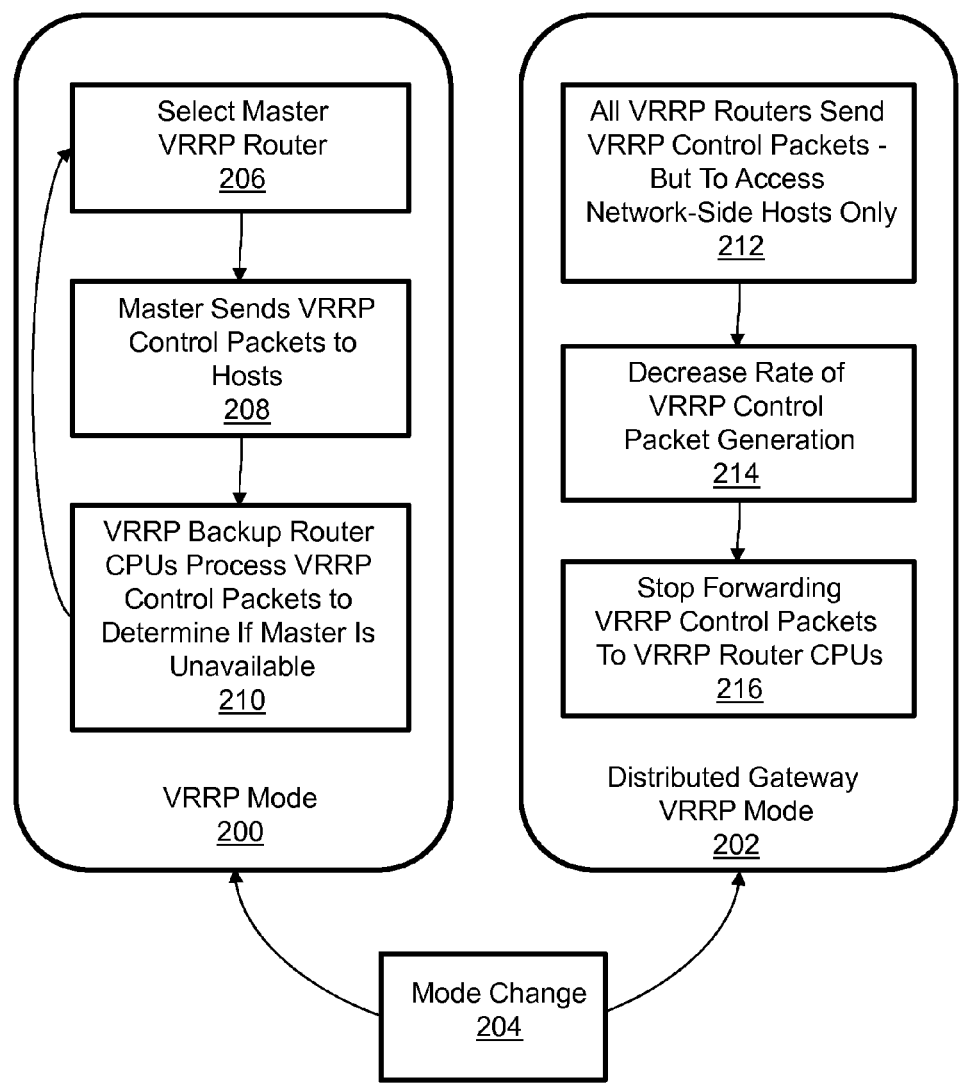
FIG. 2 illustrates VRRP and Distributed Gateway VRRP modes.

Referring now to FIGS. 1 and 2, the VRRP router group can be operated in two different modes defined by computer programs utilized by the gateway routers. The first operational mode is a standard VRRP mode 200. The second operational mode is a distributed gateway VRRP mode 202. A network administrator may prompt a mode change 204 from the standard VRRP mode 200 to the distributed gateway VRRP mode 202, and from the distributed gateway VRRP mode 202 to the standard VRRP mode 200. Further, changing modes could be partially or wholly automated. For example, processes which analyze the VRRP group could determine whether conditions are more suitable for the standard VRRP mode or the distributed gateway VRRP mode. The modes are described in greater detail below.

In the standard VRRP mode 200, one of the VRRP group routers 112, 116, 118, 124 is selected to be the master router in step 206. The selection of the master router is made in accordance with an election procedure based on a priority indicator associated with each of the VRRP group routers. As a result of the election the VRRP group router with the highest priority is designated as the master router, e.g., router $112_n$. The other VRRP routers become backup routers to the master router. In one implementation the master router is responsible for forwarding packets sent to any of the IP addresses associated with the VRRP group. In another implementation the first VRRP group router to receive a packet from one of the hosts is responsible for forwarding the packet. In both implementations the master router sends VRRP control packets 130 to all of the hosts as indicated in step 208, including to local hosts along the L2 broadcast domain of the access network via the access interface 128 of the master router and to remote hosts via the NNI 126 of the master router. A network administrator may select the frequency at which the VRRP control packets are generated by the master router. The VRRP control packets are received by the VRRP backup routers, the hosts, and other L2 and L3 devices in the various access networks of the subnet. The VRRP control packets are processed by the VRRP backup routers to determine whether the master router has become unavailable as indicated by step 210. For example, a countdown timer may be implemented by each VRRP backup router, and if a VRRP control packet is not received from the master router before the timer expires then the master router is considered to be unavailable. The timer is reset each time a VRRP control packet is received. When the master router is considered to be unavailable then an election is prompted to designate a new master router in step 206. The network administrator can select the duration of the countdown timer. The gateway routers operate in the VRRP mode 200 until a mode change 204 to the distributed gateway VRRP mode 202 is prompted.

In the distributed gateway VRRP mode 202 all VRRP group routers generate VRRP control packets as indicated by step 212. However, each VRRP group router only sends the VRRP control packets it generates to hosts in the access network with which that VRRP group router is associated as also indicated by step 212. In practice this can be accomplished by transmitting VRRP control packets on access interfaces 128 but not network-network interfaces (NNIs) 126. This has the advantage of avoiding the control plane overhead associated with sending VRRP control packets via network 108 to other access networks. Moreover, because all of the VRRP gateway routers are effectively master routers, the election of backup routers to be master router is obviated. It follows that the need for quick failover of a single master router is obviated, so it is possible to decrease the rate of VRRP control packet generation relative to the VRRP mode as indicated by step 214. The rate of VRRP control packet generation can be selected to avoid aging out of VRRP gateway router MAC addresses in tables maintained by access network-side L2 switches, e.g., on the order of minutes. Still further, the forwarding of VRRP control packets to gateway router CPUs can be halted as indicated by step 216. This has the advantage of protecting the gateway router from undesirable VRRP control packet loops in any of the access networks for that subnet. It will be appreciated by those skilled in the art that as a result the VRRP control packet processing load of the gateway routers can theoretically be eliminated while in the distributed gateway VRRP mode 202. Data packets are forwarded by the first VRRP group router to receive the data packet from one of the hosts in the distributed gateway VRRP mode.

Figure 3:
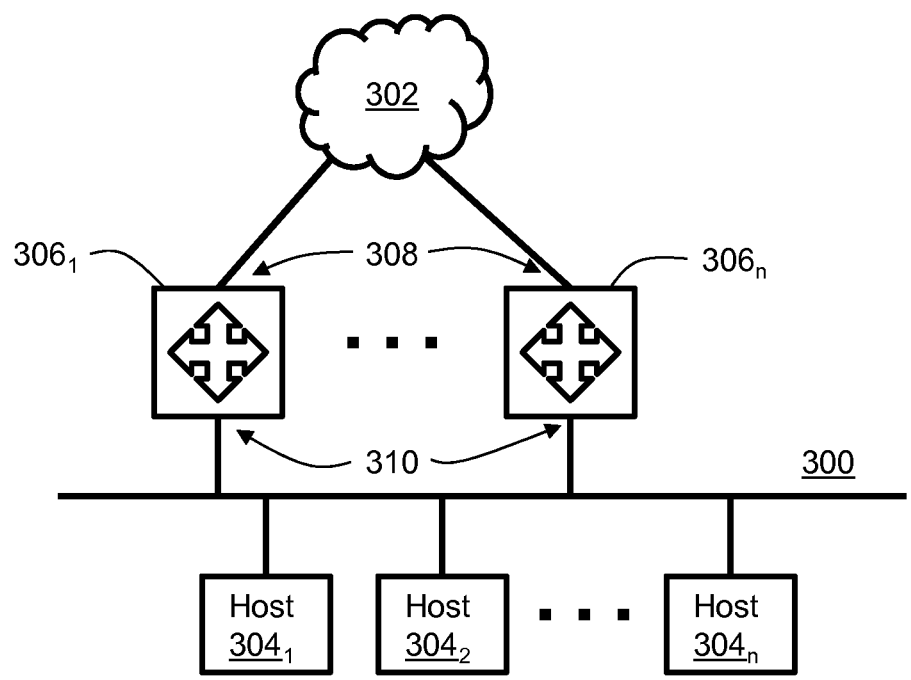
FIG. 3 illustrates a VRRP router group associated with a non-distributed network.

Referring now to FIGS. 2 and 3, the distributed gateway VRRP mode 202 can be utilized to advantage with a non-distributed subnet. The illustrated subnet includes a single access network 300 connected to another network 302. The access network includes a plurality of host devices 304₁-304ₙ and a plurality of VRRP gateway routers 306₁-306ₙ. The access network may include other network devices including but not limited to L2 and L3 routing and switching devices. Each gateway router includes a network-network interface (NNI) 308 for communicating with other devices via the other network 302. Further, each gateway router includes an access interface 310 for communicating with devices in the access network with which the gateway router is associated. Because the subnet is associated with a single access network, e.g., a particular LAN, the network is considered to be non-distributed. The standard VRRP mode 200 is basically suited to the non-distributed network environment. However, some of the advantages of the distributed gateway VRRP mode 202 are still provided in the non-distributed subnet. For example, having all VRRP routers send VRRP control packets avoids disruptive failovers in which a new master router is elected. Further, it is still possible to decrease the rate of VRRP control packet generation relative to the VRRP mode. Still further, the forwarding of VRRP control packets to gateway router CPUs can still be halted, thereby protecting the gateway routers from undesirable VRRP control packet loops in the associated access network. It will therefore be appreciated that use of the distributed gateway VRRP mode is not limited to distributed subnets.

Various aspects of the invention may be implemented partially or completely in software using computer program code. The computer program code is stored on non-transitory computer-readable memory and utilized by processing hardware to implement instructions corresponding to certain steps. The program code may be provided as a computer program product or be integrated into network storage equipment. All of the illustrated devices may include processing hardware and non-transitory storage media capable of storing and implementing computer program code.

While the invention is described through the above exemplary embodiments, it will be understood by those of ordinary skill in the art that a wide variety of modifications to and variations of the illustrated embodiments may be made without departing from the inventive concepts herein disclosed. Moreover, while the embodiments are described in connection with various illustrative structures, one skilled in the art will recognize that the system may be embodied using a wide variety of specific structures. Moreover, various features, aspects and embodiments may be combined in any of various ways without departing from the inventive concepts herein disclosed. Accordingly, the invention should not be viewed as limited except by the scope and spirit of the appended claims.

What is claimed is:

1. An apparatus comprising:
a plurality of routers arranged as a virtual router redundancy protocol (VRRP) group, wherein each of the plurality of routers selectably operates in one of a first mode of operation or a second mode of operation; and
wherein each of the plurality of routers comprises:
a central processing unit, and
an access network interface in communication with a first access network;
wherein, when each of the plurality of routers operates in the first mode of operation, each of the plurality of routers concurrently generates and sends virtual router control packets for the VRRP group to at least one of a first plurality of host devices connected to the first access network.

2. The apparatus of claim 1, wherein:
the plurality of routers communicates with a distributed subnet comprising the first access network and a second access network; and
when each of the plurality of routers changes from the first mode of operation second mode of operation in which one of the plurality of routers is selected as a master router for the VRRP group, only the master router generates virtual router control packets, the master router sending the virtual router control packets to the first plurality of host devices connected to the first access network and a second plurality of host devices connected to the second access network.

3. The apparatus of claim 1, wherein:
the plurality of routers communicates with a distributed subnet comprising the first access network and a second access network; and
each of the plurality of routers comprises a network-network interface (NNI) in communication with the second access network; and
each of the plurality of routers sends the virtual router control packets via the access network interface and avoids sending the virtual router control packets via the NNI.

4. The apparatus of claim 2, wherein a frequency of control packet generation is lower in the first mode of operation than in the second mode of operation.

5. A method comprising:
arranging a plurality of routers as a virtual router redundancy protocol (VRRP) group, wherein each of the plurality of routers selectably operates in one of a first mode of operation or a second mode of operation;
communicatively connecting a respective access network interface of each of the plurality of routers to a first access network; and
operating each of the plurality of routers in the first mode of operation in which each of the routers of the plurality of routers concurrently generates and sends virtual router control packets for the VRRP group to at least one of a first plurality of host devices connected to the first access network.

6. The method of claim 5 further comprising:
communicatively connecting a respective network-network interface (NNI) of each of the plurality of routers to a second access network, wherein the first access network and the second address network are part of a distributed subnet;
changing, by each of the plurality of routers, from the first mode of operation second mode of operation;
selecting, by the plurality of routers operating in the second mode of operation, one of the plurality of routers as a master router for the VRRP group;
generating, only by the master router, the virtual router control packets, and
sending, only by the master router, the virtual router control packets to the first plurality of host devices connected to the first access network and a second plurality of host devices connected to the second access network.

7. The method of claim 5 further comprising:
communicatively connecting a respective network-network interface (NNI) of each of the plurality of routers to a second access network, wherein the first access network and the second address network are part of a distributed subnet;
sending, by each of the plurality of routers operating in the first mode of operation, the virtual router control packets via the access network interface and avoiding sending the virtual router control packets via the NNI.

8. The method of claim 6, further comprising:

generating, by each of the plurality of routers, the virtual router control packets at a lower frequency in the first mode of operation than in the second mode of operation.

\* \* \* \* \*

UNITED STATES PATENT AND TRADEMARK OFFICE
CERTIFICATE OF CORRECTION

PATENT NO. : 9,525,624 B2
APPLICATION NO. : 13/898836
DATED : December 20, 2016
INVENTOR(S) : Srikanth Keesara and Roger Lapuh Page 1 of 1

It is certified that error appears in the above-identified patent and that said Letters Patent is hereby corrected as shown below:

In the Claims

Column 6, Line 6, "mode of operation second mode of operation in which" should read --mode of operation to the second mode of operation in which--
Column 6, Line 46, "network and the second address network are part of a" should read --network and the second access network are part of a--
Column 6, Line 49, "mode of operation second mode of operation;" should read --mode of operation to the second mode of operation;--
Column 6, Line 54, "control packets, and" should read --control packets; and--
Column 6, Line 64, "network and the second address network are part of a" should read --network and the second access network are part of a--

Signed and Sealed this
Third Day of April, 2018

Andrei Iancu
*Director of the United States Patent and Trademark Office*